US012234409B2

(12) United States Patent
Azuly

(10) Patent No.: US 12,234,409 B2
(45) Date of Patent: Feb. 25, 2025

(54) SYSTEM AND METHOD FOR PYROLYSIS OF PLASTICS

(71) Applicant: CO-ENERGY LTD., Tel Aviv (IL)

(72) Inventor: Amit Azuly, Beer Sheva (IL)

(*) Notice: Subject to any disclaimer, the term of this patent is extended or adjusted under 35 U.S.C. 154(b) by 169 days.

(21) Appl. No.: 17/911,713

(22) PCT Filed: Mar. 15, 2021

(86) PCT No.: PCT/IB2021/052128
§ 371 (c)(1),
(2) Date: Sep. 15, 2022

(87) PCT Pub. No.: WO2021/186322
PCT Pub. Date: Sep. 23, 2021

(65) Prior Publication Data
US 2023/0111010 A1   Apr. 13, 2023

Related U.S. Application Data

(60) Provisional application No. 62/991,135, filed on Mar. 18, 2020.

(51) Int. Cl.
*C10B 21/12* (2006.01)
*B01J 6/00* (2006.01)
(Continued)

(52) U.S. Cl.
CPC .............. *C10B 21/12* (2013.01); *B01J 6/008* (2013.01); *B01J 19/20* (2013.01); *C10B 1/10* (2013.01);
(Continued)

(58) Field of Classification Search
CPC ........... C10B 53/07; C10B 7/10; C10B 19/00; C10B 47/30; C10B 1/10; C10B 7/00;
(Continued)

(56) References Cited

U.S. PATENT DOCUMENTS

| 4,412,889 A | 11/1983 | Deck |
| 4,647,443 A | 3/1987 | Apffel |
| 5,129,995 A | 7/1992 | Agarwal |
| 6,757,590 B2 | 6/2004 | Ross et al. |
| 2005/0003247 A1 | 1/2005 | Pham |

(Continued)

FOREIGN PATENT DOCUMENTS

| DE | 3018572 A1 | 11/1981 |
| DE | 102005001569 A1 | 7/2006 |

(Continued)

*Primary Examiner* — Renee Robinson
(74) *Attorney, Agent, or Firm* — AlphaPatent Associates Ltd.; Daniel J. Swirsky

(57) ABSTRACT

A continuous pyrolysis system including a pyrolysis chamber, a heating chamber, a feeding chamber having a pressure input, an output coupled to the pyrolysis chamber, and a feeding opening opened to ambient atmosphere, a flame injector injecting ambient air and combustible material into the heating chamber, a pumping device with an input coupled to the heating chamber, and an output coupled to the pressure input of the feeding chamber, a $O_2$ sensor within the heating chamber, and/or a pressure transducer within the feeding chamber, and a controller coupled to the $O_2$ sensor, the pressure transducer, the flame injector, and the pumping device, for controlling the flame injector to inject ambient air and/or combustible material to maintain within the heating chamber $O_2$ concentration between 8% and 10%, and/or for controlling the pumping device to maintain pressure in the feeding chamber above ambient pressure.

18 Claims, 5 Drawing Sheets

(51) Int. Cl.
  *B01J 19/20* (2006.01)
  *C10B 1/10* (2006.01)
  *C10B 7/10* (2006.01)
  *C10B 19/00* (2006.01)
  *C10B 47/30* (2006.01)
  *C10B 53/07* (2006.01)

(52) U.S. Cl.
  CPC ................ *C10B 7/10* (2013.01); *C10B 19/00* (2013.01); *C10B 47/30* (2013.01); *C10B 53/07* (2013.01)

(58) Field of Classification Search
  CPC .. C10B 21/12; B01J 6/008; B01J 19/20; B01J 19/28; C10G 1/10
  See application file for complete search history.

(56) References Cited

U.S. PATENT DOCUMENTS

| | | |
|---|---|---|
| 2006/0057443 A1 | 3/2006 | Cooper |
| 2009/0286295 A1 | 11/2009 | Medoff et al. |
| 2013/0011803 A1* | 1/2013 | Siemons ................ C10B 57/00 432/9 |
| 2015/0027385 A1 | 1/2015 | Von Der Osten-Sack et al. |
| 2016/0053182 A1 | 2/2016 | Ericsson et al. |
| 2019/0039266 A1 | 2/2019 | Gehr et al. |

FOREIGN PATENT DOCUMENTS

| | | | |
|---|---|---|---|
| JP | H11226542 A | 8/1999 | |
| WO | WO-03012007 A1 * | 2/2003 | ............ C10B 19/00 |
| WO | 2020/051702 A1 | 3/2020 | |

* cited by examiner

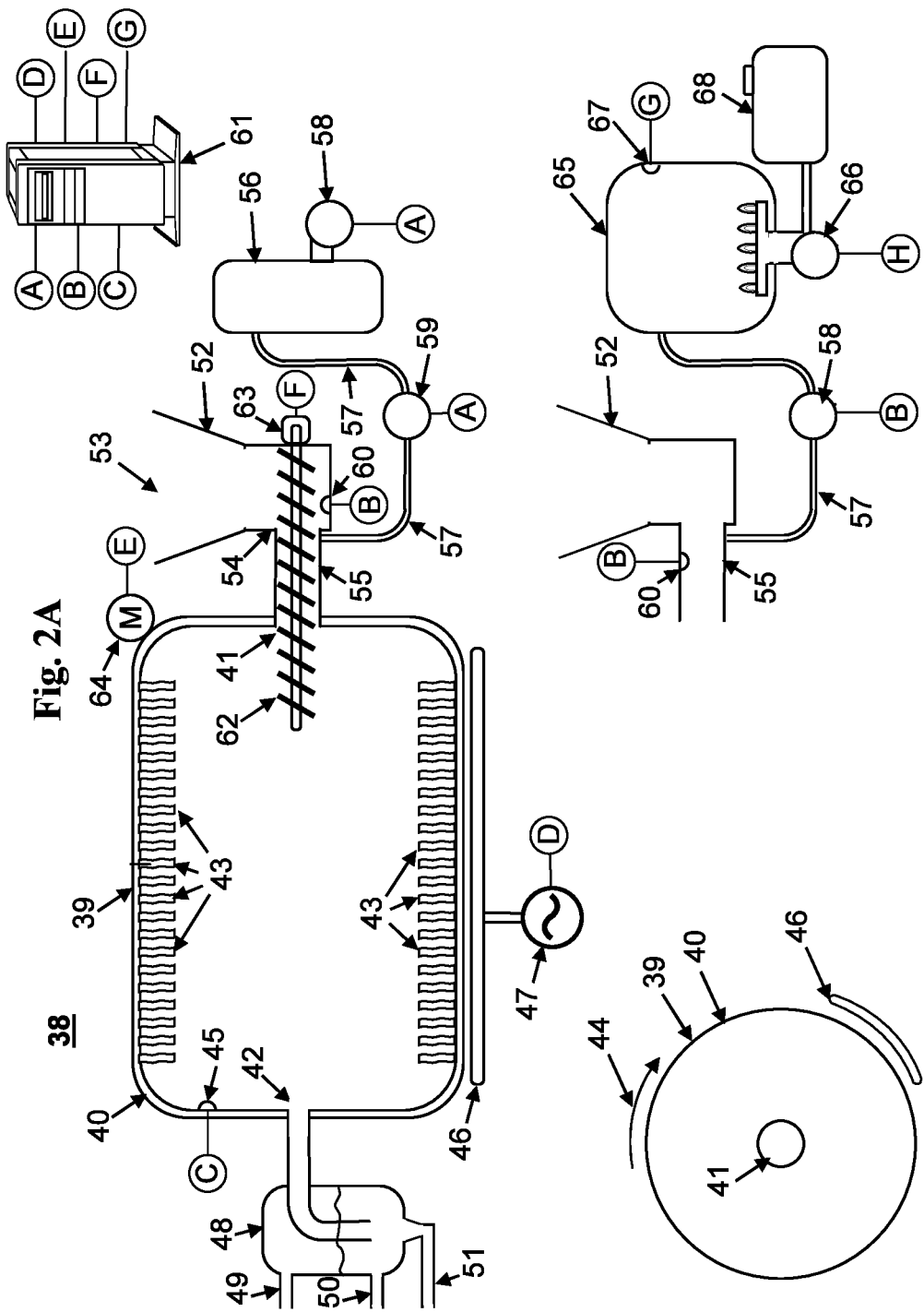

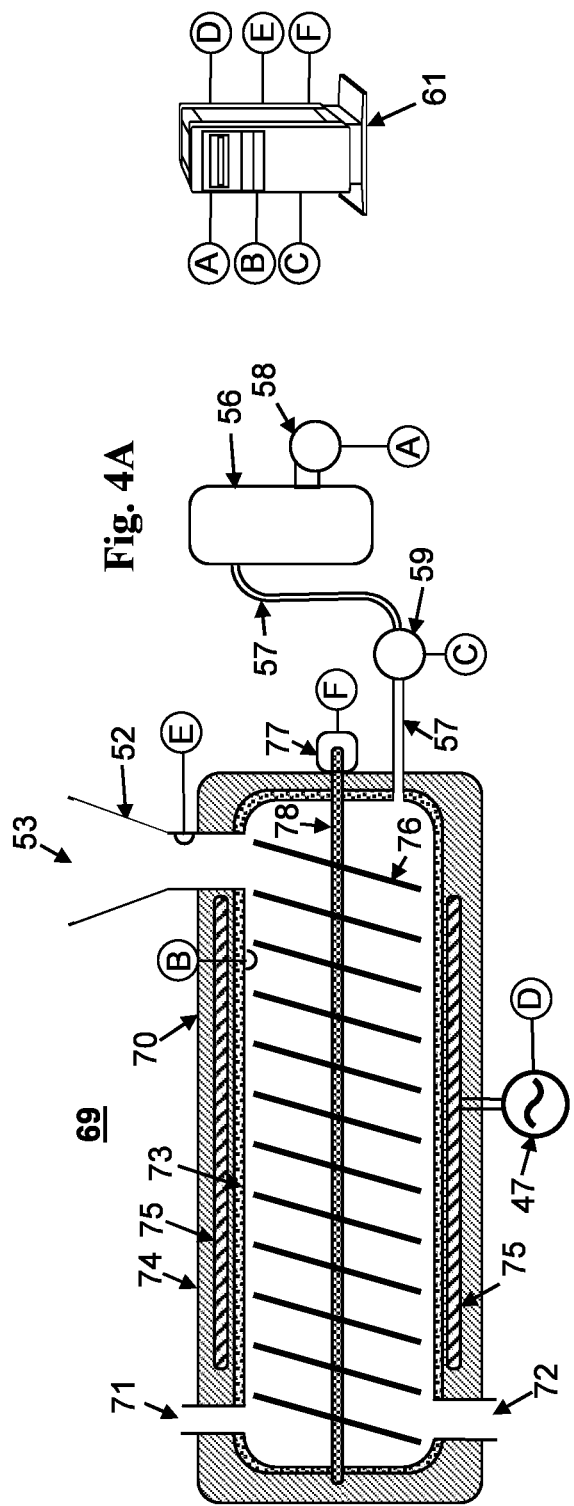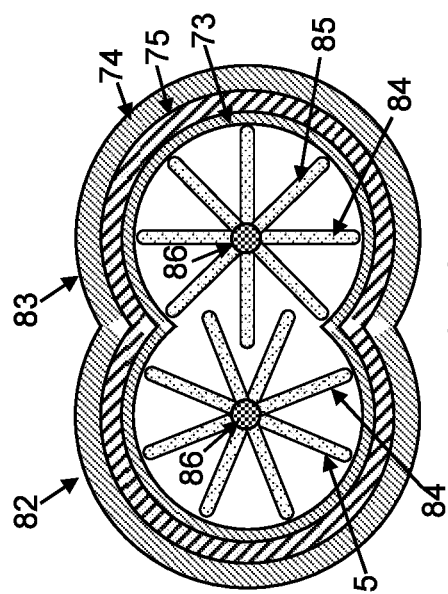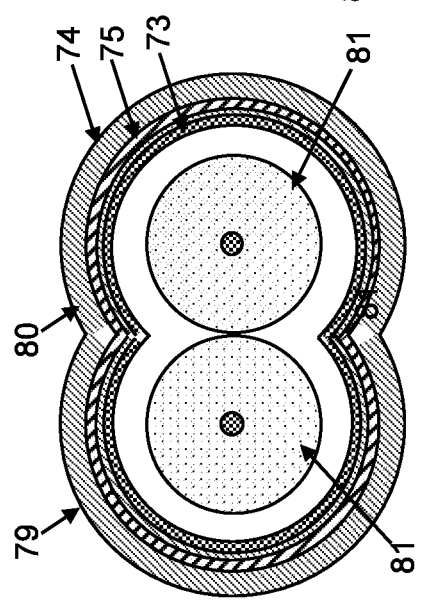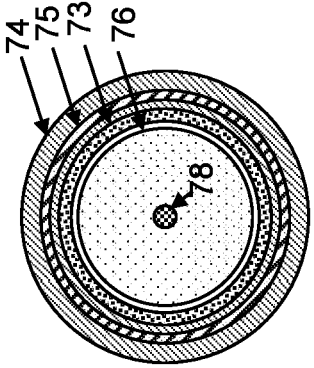

SYSTEM AND METHOD FOR PYROLYSIS OF PLASTICS

FIELD

The method and apparatus disclosed herein are related to the field of Pyrolysis, and more particularly, but not exclusively, to continuous Pyrolysis of plastic materials.

BACKGROUND

Methods and system of pyrolysis are known, however, operating in batch mode. Continuous pyrolysis is advantageous over batch pyrolysis, however, feeding the pyrolytic material in the presence of ambient air may introduce oxygen into the pyrolysis chamber and disturb the pyrolytic process.

There is thus a widely recognized need for, and it would be highly advantageous to have, a system and method for a continuous pyrolysis process, overcoming the above limitations.

SUMMARY

According to one exemplary embodiment, there is provided method and a system for continuous pyrolysis including a pyrolysis chamber including a first input opening and a first output opening, a heating chamber including a second input opening and a second output opening, a feeding chamber including a third feeding opening, opened to ambient atmosphere and arranged to receive grinded material, a third pressure opening, and a third output opening coupled to the first input opening of the pyrolysis chamber, a flame injector device coupled to the second input opening of the heating chamber and injecting ambient air and combustible material into the heating chamber, a pumping device including an input opening coupled to the second output opening of the heating chamber, and an output opening coupled to the third pressure opening of the feeding chamber, an Oxygen ($O_2$) sensor, or, alternatively a $CO_2$ sensor, installed within the heating chamber, and/or a pressure transducer installed within the feeding chamber, and a controller electrically coupled to the $O_2$ sensor, to the pressure transducer, to the flame injector and to the pumping device, the controller controlling the flame injector device to inject at least one of the ambient air and the combustible material to maintain within the heating chamber $O_2$ concentration between 8% and 10%, and/or the pumping device to maintain pressure in the feeding chamber above ambient pressure to prevent ambient air from entering the feeding chamber via the third feeding opening.

According to another exemplary embodiment, the pyrolysis chamber may be located within the heating chamber.

According to still another exemplary embodiment, the heating chamber may additionally include a rolling input opening and a rolling output opening.

According to yet another exemplary embodiment, an input pipe may be installed within the rolling input opening and connecting between the third output opening of the feeding chamber and the first input opening of the pyrolysis chamber.

Further, according to another exemplary embodiment, an output pipe installed within the rolling output opening and coupled to the first output opening of the pyrolysis chamber.

Still further, according to another exemplary embodiment, the pyrolysis chamber is arranged to rotate within the heating chamber.

Yet further, according to another exemplary embodiment, the flame injector device is controlled by the controller to heat the pyrolysis chamber to a predefined temperature.

Even further, the pyrolysis chamber has the shape of a cylinder and where the cylinder side is made of thermally conductive material.

Additionally, according to another exemplary embodiment, a unidirectional valve device may be coupled to the first output opening of the pyrolysis chamber to enable a continuous flow of gaseous material out of the pyrolysis chamber, and to prevent the flow of ambient air into the pyrolysis chamber through the first output opening.

According to still another exemplary embodiment, a conveyer device may be arranged to propel the grinded material from the feeding chamber to the pyrolysis chamber.

According to yet another exemplary embodiment, a conveyer device may be arranged to propel the grinded material from the feeding chamber into the pyrolysis chamber, and an inductive heating device may be used for heating the grinded material inside the pyrolysis chamber.

Further, according to another exemplary embodiment, the pyrolysis chamber may be made of a thermally insulating material, and the pyrolysis chamber may contain an inductive element including a ferromagnetic and ferrimagnetic material for being heat by the inductive heating device for heating the grinded material.

Still further, according to another exemplary embodiment, the inductive element may be affixed within the pyrolysis chamber, or freely distributed within the pyrolysis chamber.

Unless otherwise defined, all technical and scientific terms used herein have the same meaning as commonly understood by one of ordinary skill in the relevant art. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

BRIEF DESCRIPTION OF THE DRAWINGS

Various embodiments are described herein, by way of example only, with reference to the accompanying drawings. With specific reference now to the drawings in detail, it is stressed that the particulars shown are by way of example and for purposes of illustrative discussion of the preferred embodiments only, and are presented in order to provide what is believed to be the most useful and readily understood description of the principles and conceptual aspects of the embodiment. In this regard, no attempt is made to show structural details of the embodiments in more detail than is necessary for a fundamental understanding of the subject matter, the description taken with the drawings making apparent to those skilled in the art how the several forms and structures may be embodied in practice.

In the drawings:

FIG. 2A is a simplified illustration of cut through an inductive continuous pyrolysis system;

FIG. 2B is a simplified illustration of a perpendicular side view of the inductive continuous pyrolysis system;

FIG. 3 is a simplified illustration of cut through a heating chamber that may be an optional part of the inductive continuous pyrolysis system;

FIG. 4A is a simplified illustration of cut through the longitude of an inductive continuous pyrolysis system with a stationary body;

FIG. 4B is a simplified illustration of cut through the latitude of the inductive continuous pyrolysis system with a stationary body;

FIG. 5 is a simplified illustration of cut through the latitude of an inductive continuous pyrolysis system with a dual stationary body and a spiral conveyer;

FIG. 6 is a simplified illustration of cut through the latitude of an inductive continuous pyrolysis system with a dual stationary body and a propeller conveyer;

DETAILED DESCRIPTION

Figure 1:
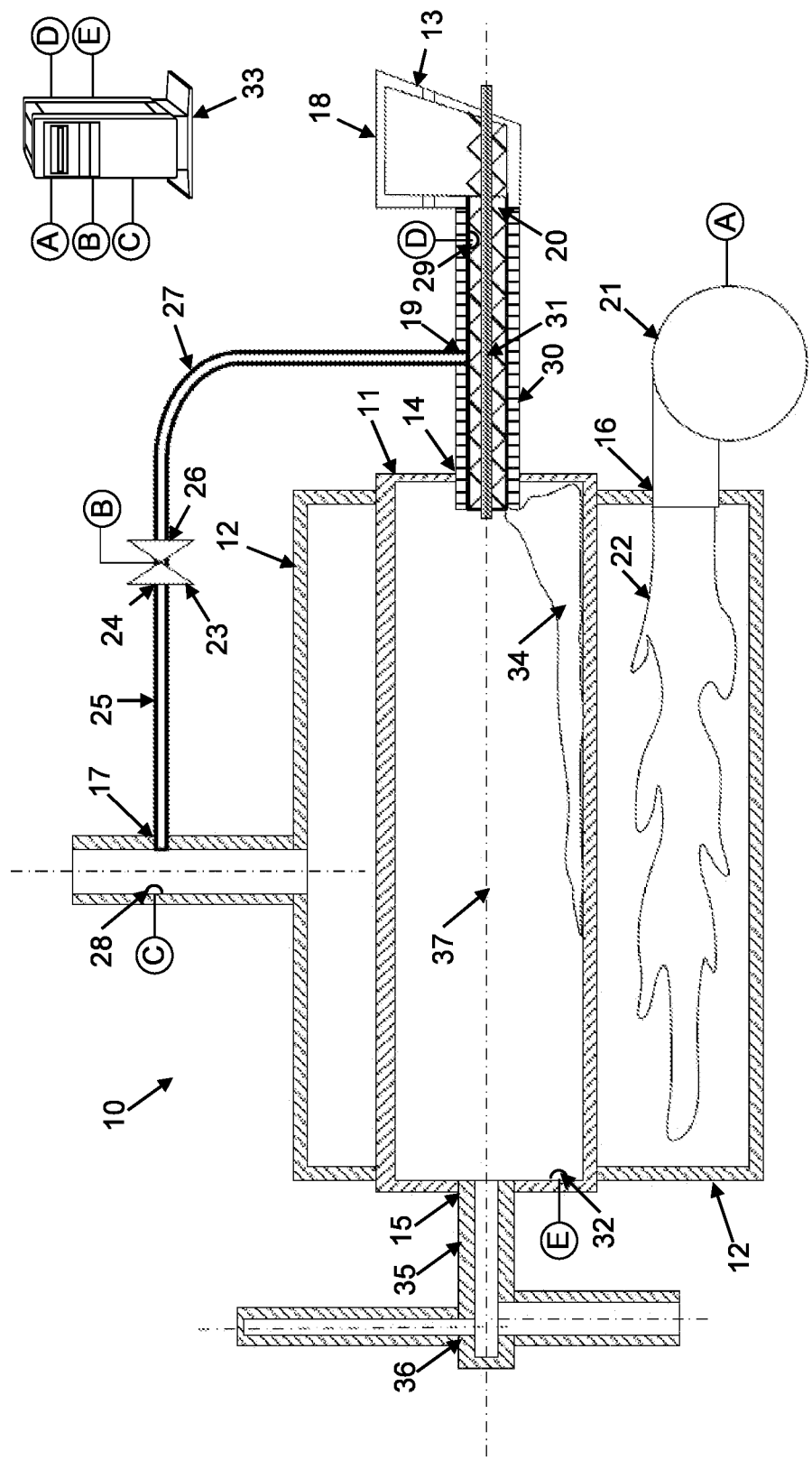
FIG. 1 is a simplified illustration of a cut through a continuous pyrolysis system.

The present embodiments comprise systems and methods for continuous pyrolysis, and particularly, though not limited to, continuous pyrolysis process of plastic materials, such as polyethylene, polypropylene, etc.

Before explaining at least one embodiment in detail, it is to be understood that the embodiments are not limited in its application to the details of construction and the arrangement of the components set forth in the following description or illustrated in the drawings. Other embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different figures may use different scales and different scales can be used even within the same drawing, for example different scales for different views of the same object or different scales for the two adjacent objects.

Reference is now made to FIG. 1, which is a simplified illustration of a cut through a continuous pyrolysis system 10, according to one exemplary embodiment.

As shown in FIG. 1, continuous pyrolysis system 10 may include a pyrolysis chamber 11, a heating chamber 12, and a feeding chamber 13. Pyrolysis chamber 11 may typically include a first input opening 14, and a first output opening 15.

Heating chamber 12 may typically include a second input opening 16, and a second output opening 17. Feeding chamber 13 may typically include a third feeding opening 18 opened to ambient atmosphere and arranged to receive grinded and/or shredded material, a third pressure opening 19, and a third output opening 20 coupled to the first input opening 14 of the pyrolysis chamber 11. The grinded and/or shredded materials may typically be plastic materials such as polyethylene, polypropylene, etc. These materials may be grinded and/or shredded to pieces of substantially similar size to achieve even distribution of heat among the grinded and/or shredded particles.

Continuous pyrolysis system 10 may additionally include a flame injector (e.g., burner) 21 coupled to the second input opening 16 of the heating chamber 12. Flame injector device 21 is arranged to collect ambient air and pump, or inject, it into heating chamber 12 through second input opening 16. Flame injector device 21 is additionally arranged to inject flammable material into heating chamber 12 through the second input opening 16. For example, flame injector device 21 may mix the flammable material with the ambient air, ignite the flammable material into a burning flame, and inject the combustible (burning) material 22 into the heating chamber 12 through the second input opening 16. Particularly, flame injector device 21 may control the amount of each of the flammable material with the ambient air, and/or to control the mixture ratio between the flammable material and the ambient air.

Continuous pyrolysis system 10 may additionally include a pumping device 23 that may typically include an input opening 24 coupled to the second output opening 17 of the heating chamber, typically through a pipe 25, and an output opening 26 coupled to the third pressure opening 19 of the feeding chamber, typically through a pipe 27.

Continuous pyrolysis system 10 may additionally include an Oxygen ($O_2$) sensor 28, which may be installed within the heating chamber 12, or in the output of the heating chamber 12, as shown in FIG. 1. The $O_2$ sensor 28 may provide measurements of the $O_2$ content and/or concentration within heating chamber 12 and particularly in the input to pumping device 23. It is appreciated that $O_2$ sensor 28 may be replaced by a $CO_2$ sensor or a similar sensor.

Continuous pyrolysis system 10 may additionally include a pressure transducer 29, which may be installed within the feeding chamber 13. As shown in FIG. 1, the third output opening 20 of feeding chamber 13 may be coupled to the first input opening 14 of the pyrolysis chamber 11 through a pipe 30 including a conveyer device 31 and the pressure transducer 29 may be installed inside the pipe 30. The conveyer device 31 may be used to transport grinded material from feeding chamber 13 to pyrolysis chamber 11 through pipe 30. Pressure transducer 29 may provide measurements of the gaseous pressure within feeding chamber 13 and/or pipe 30.

Continuous pyrolysis system 10 may additionally include a temperature sensor 32, which may be installed within the pyrolysis chamber 11, and/or at the output of the pyrolysis chamber 11. Temperature sensor 32 may provide temperature measurements of the gaseous material within pyrolysis chamber 11.

Continuous pyrolysis system 10 may additionally include a controller 33. Controller 33 may be any type of computational device or system, typically including at least one processor, at least one memory and/or storage device, and at least one communication device or interface enabling the processor to communicate input data, and/or output data, and/or control at least one sensor device, actuating device, motor, pump, etc.

Controller 33 may be electrically coupled to, and/or controllably electrically coupled to, flame injector 21 via connecting element A, and to pumping device 23 via connecting element B, and/or to $O_2$ sensor 28 via connecting element C, and/or to pressure transducer 29 via connecting element D, and/or to the temperature sensor 32 via connecting element E.

Controller 33 may be configured to control the flame injector device 21 to inject ambient air and/or combustible material into heating chamber 12, for example, to maintain predetermined temperature, and/or temperature range, for example according to measurements received from temperature sensor 32.

Controller 33 may be additionally configured to control the flame injector device 21 to inject ambient air and/or combustible material into heating chamber 12, for example, to maintain predetermined concentration of $O_2$ within the heating chamber 12. For example, controller 33 may control the concentration of $O_2$ according to measurements received from $O_2$ sensor 28. For example, controller 33 may control the concentration of $O_2$ between 8% and 12%.

Controller 33 may be additionally configured to control the pumping device 23, for example to maintain pressure in the feeding chamber 13, or pipe 30. For example, controller 33 may control the pressure in the feeding chamber 13 according to measurements received pressure sensor 29. For example, controller 33 may control the pressure above the pressure of the ambient atmosphere to prevent ambient air from entering the feeding chamber 13, and/or or pipe 30, and/or pyrolysis chamber 11.

It is appreciated that a maneuvering device such as an electric motor (not shown) may be coupled to pyrolysis chamber 11 and may cause pyrolysis chamber 11 to roll so that the grinded material 34 entering pyrolysis chamber 11 through pipe 30 may distribute throughout pyrolysis chamber 11. It is appreciated that a pyrolysis chamber 11 may roll within heating chamber 12 and/or around input pipe 30 and output pipe 35. It is appreciated that pyrolysis chamber 11 may have the shape of a cylinder, and that the cylinder side (envelop) may be made of a thermally conductive material.

It is appreciated pyrolysis chamber 11 may be coupled via output pipe 35 to a check valve device 36, to enable a continuous flow of gaseous material out of the pyrolysis chamber 11, and to prevent the flow of ambient air into the pyrolysis chamber 11 through the output opening.

As shown in FIG. 1, the pyrolysis chamber 11 may be located within the heating chamber 12. The heating chamber 12 may include a rolling input opening 14 and a rolling output opening 15. The input pipe 30 installed within the rolling input opening may be connected between the output opening of the feeding chamber 13 and the input opening of the pyrolysis chamber 11. The output pipe 35 installed within the rolling output opening may be connected between the output opening of the pyrolysis chamber 11 and the check valve device 36. Thus, the pyrolysis chamber may rotate within the heating chamber 12.

Pyrolysis chamber 11 may be rolling about the horizontal axis 37, and/or about the rolling input opening and the rolling output opening described above. Pyrolysis chamber 11 may be rolling to distribute (and re-distribute) the grinded materials 34 throughout the pyrolysis chamber 11, and to distribute the heat throughout the grinded materials 34 in the pyrolysis chamber 11.

Reference is now made to FIG. 2A, which is a simplified illustration of cut through a inductive continuous pyrolysis system 38, and to FIG. 2B, which is a simplified illustration of a cut through perpendicular (latitude) side view of inductive continuous pyrolysis system 38, according to one exemplary embodiment.

As an option, the illustrations of FIG. 2A and FIG. 2B may be viewed in the context of the previous Figures. Of course, however, the illustrations of FIG. 2A and FIG. 2B may be viewed in the context of any desired environment. Further, the aforementioned definitions may equally apply to the description below.

As shown in FIG. 2A, inductive continuous pyrolysis system 38 may include a pyrolysis chamber 39, including a thermally insulating wall 40, an input opening 41 and an output opening 42 in the wall 40, and inductive thermal elements 43.

As shown in FIG. 2B, inductive continuous pyrolysis system 38 may have the shape of a cylinder and may rotate along its axis, for example, around the openings 41 and 42, for example, as shown by arrow 44. pyrolysis system 38 may be rolling to distribute (and re-distribute) the grinded materials throughout the pyrolysis chamber, and to distribute the heat throughout the grinded materials in the pyrolysis chamber.

Inductive thermal elements 43 may be distributed throughout pyrolysis chamber 39, or within a limited area of pyrolysis chamber 39. Inductive thermal elements 43 may be fixed, such as attached to the 40 of pyrolysis chamber 39. Alternatively, inductive thermal elements 43 may be free to move within pyrolysis chamber 39, such as small rods or beads. A temperature sensor 45 may be installed inside pyrolysis chamber 39.

Inductive continuous pyrolysis system 38 may additionally include a an induction radiator 46, that may installed beside the wall 40 of pyrolysis chamber 39, on the outside of pyrolysis chamber 39. Induction radiator 46 may be attached to the wall 40 of pyrolysis chamber 39. Induction radiator 46 may be radiatively coupled to the inductive thermal elements 43 using electromagnetic radiation. Induction radiator 46 may include, or may be electrically coupled to, a power supply 47 to feed electric current to induction radiator 46.

Inductive continuous pyrolysis system 38 may additionally include a separator 48 coupled to opening 42. Separator 42 may separate the output produced by pyrolysis chamber 39 into gas material (via opening 49), liquid material (via opening 50) and solid or ashes material (via opening 51), also functioning as a check valve to eliminate ambient air from entering into pyrolysis chamber 39 through opening 42. As shown in FIG. 2A, separator 48 is arranged as an anti-syphon trap, however, other arrangements are contemplated.

Alternatively, as shown in FIG. 2B, induction radiator 46 may be placed close to the wall 40 of pyrolysis chamber 39 without touching the wall 40 so that pyrolysis chamber 39 may rotate with respect to induction radiator 46. Induction radiator 46 may be placed beneath pyrolysis chamber 39. Alternatively, as shown in FIG. 2B, induction radiator 46 may be placed in an angle rotationally preceding the bottom of pyrolysis chamber 39, so that heating of the inductive thermal elements 43 reaches maximum when the respective inductive thermal elements 43 reach the lowest point of pyrolysis chamber 39.

As shown in FIG. 2A, inductive continuous pyrolysis system 38 may additionally include a feeding chamber 52 including an input opening 53 for receiving grinded materials, and an output opening 54 for providing the grinded material to the input opening 41 of pyrolysis chamber 39. The grinded materials may typically be plastic materials such as polyethylene, polypropylene, etc. The output opening 54 of feeding chamber 52 and the input opening 41 of pyrolysis chamber 39 may be connected by tube 55.

Inductive continuous pyrolysis system 38 may additionally include a Nitrogen source 56, such as a Nitrogen generator, such as a membrane nitrogen generator, or a pressure swing adsorption (PSA) nitrogen generator, etc. Nitrogen source 56 may be coupled to feeding chamber 52 or to tube 55, for example via a pipe 57. A pump 58, coupled to the input opening of Nitrogen source 56 may pump air into Nitrogen source 56. Alternatively, or additionally, a pump 59 may be coupled to pipe 57, to pump Nitrogen into feeding chamber 52 or tube 55.

Nitrogen source 56 and pump 58 pump Nitrogen into feeding chamber 52 or tube 55 to maintain pressure above ambient pressure to prevent ambient air from entering pyrolysis chamber 39. Gaseous pressure within feeding chamber 52 or tube 55 may be measured using a pressure sensor 60 installed within feeding chamber 52 or tube 55.

Inductive continuous pyrolysis system 38 may additionally include a controller 61. Controller 61 may be any type of computational device or system, typically including at least one processor, at least one memory and/or storage device, and at least one communication device or interface enabling the processor to communicate input data, and/or output data, and/or control at least one sensor device, actuating device, motor, pump, etc.

Controller 61 may be electrically coupled to, and/or controllably electrically coupled to pumping devices 58 and 59 via connecting elements A, and/or to pressure transducer 60 via connecting element B, and/or to the temperature sensor 45 via connecting element C.

Additionally, controller 61 may be electrically coupled to, and/or controllably electrically coupled via connecting element D to induction radiator 46, for example by controlling power supply 47. Controller 61 may be electrically coupled to, and/or controllably electrically coupled via connecting element E to conveyer 62 carrying the grinded material from feeding chamber 52 into pyrolysis chamber 39, for example by controlling a motor 63. Controller 61 may be electrically coupled to, and/or controllably electrically coupled via connecting element F to motor 64 rotating the pyrolysis chamber 39.

Controller 61 may be configured to control induction radiator 46, and/or conveyer 62, and/or motor 64, for example, to maintain a predetermined temperature and/or temperature range, for example according to measurements received from temperature sensor 45.

Reference is now made to FIG. 3, which is a simplified illustration of cut through a heating chamber 65, which may be optional part of inductive continuous pyrolysis system 38, according to one exemplary embodiment.

As an option, the illustration of FIG. 3 may be viewed in the context of the previous Figures. Of course, however, the illustration of FIG. 3 may be viewed in the context of any desired environment. Further, the aforementioned definitions may equally apply to the description below.

The heating chamber 65 of FIG. 3 may replace the Nitrogen source 56 of FIG. 2A. The heating chamber 65 of FIG. 3 operates similarly to the heating chamber 12 of FIG. 1 but serves only to provide low Oxygen gaseous content to feeding chamber 52 or pipe 55.

Heating chamber 65 of FIG. 3 may include a flame thruster 66, and a $O_2$ sensor 67, as well as a source of flammable material 68. Flame thruster 66 may control the amount and mix of ambient air and flammable material, inject the ambient air and flammable material into the heating chamber 65 and ignite a flame to produce gaseous material having low level of $O_2$. Subsequently, controller 61 may be configured to receive $O_2$ measurements from $O_2$ sensor 67 (e.g., via connector G) and control flame thruster 66 (e.g., via connector H) accordingly to produce gaseous material having $O_2$ concentration between 6% and 12%. It is appreciated that $O_2$ sensor may be replaced by a $CO_2$ sensor or a similar sensor.

Reference is now made to FIG. 4A, which is a simplified illustration of cut through the longitude of an inductive continuous pyrolysis system 69 with a stationary pyrolysis chamber 70, and to FIG. 4B, which is a simplified illustration of cut through the latitude of inductive continuous pyrolysis system 69 with the stationary pyrolysis chamber 70, according to one exemplary embodiment.

As an option, the illustrations of FIG. 4A and FIG. 4B may be viewed in the context of the previous Figures. Of course, however, the illustrations of FIG. 4A and FIG. 4B may be viewed in the context of any desired environment. Further, the aforementioned definitions may equally apply to the description below.

As shown in FIG. 4A and FIG. 4B, inductive continuous pyrolysis system 69 may include air pump 58 coupled to the input opening of nitrogen source 56 (such as the nitrogen source 56 of FIG. 2A), which output may be coupled to stationary pyrolysis chamber 70 through pipes 57 and pump 58 pumping Nitrogen into stationary pyrolysis chamber 70.

Stationary pyrolysis chamber 70 may include a feeding chamber 52 with opening 53 for feeding grinded materials into stationary pyrolysis chamber 70, as well as gas output 71 and liquid and ash output 72. Gas output 71 may be coupled to a check valve such as check valve device 36 of FIG. 1, or separator 48 of FIG. 2B, or any similar device.

Stationary pyrolysis chamber 70 may include an inner layer 73 of solid non-ferrous material, an external layer 74 of heat-insulation material, and an inductor (induction radiator) 75 embedded in the external layer. Inductor 75 may include, or may be electrically coupled to, a power supply 47 to feed electric current to inductor 75.

Stationary pyrolysis chamber 70 may include a conveyer, or agitator, such as worm, or spiral, conveyer 76, to distribute throughout the stationary pyrolysis chamber 70 the grinded or shredded material that may be entered via the feeding chamber 52. Conveyer, or agitator, 76 may be made of ferrous material, or a similar material that may absorb the radiation emitted by inductor 75. Hence conveyer, or agitator, 76 may also produce heat and distribute the heat among the grinded or shredded material distributed within stationary pyrolysis chamber 70.

Pyrolysis chamber 70 is stationary in the sense that it is not rolling such as pyrolysis chamber 11 of FIG. 1, and/or pyrolysis chamber 39 of FIG. 2A and FIG. 2B. Instead, the conveyer, or agitator, 76 is rolling to distribute grinded or shredded materials, as well as heat, within pyrolysis chamber 70. Stationary pyrolysis chamber 70 a motor 77 and an axle 78 to rotate conveyer, or agitator, 76.

As shown in FIG. 4A, inductive continuous pyrolysis system 69 may include a computational device (controller) 61, similar to controller 61 of inductive continuous pyrolysis system 38 of FIG. 2A, with similar functions and connections to components of inductive continuous pyrolysis system 69, such as sensors, pumps, and motors. For example, for sensing temperature, pressure, Oxygen concentration, etc. and to control pumps 58 and 59, motor 77, and inductor 75, for example by controlling power supply 47 and/or electric current provided to inductor 75.

Reference is now made to FIG. 5, which is a simplified illustration of cut through the latitude of an inductive continuous pyrolysis system 79 with a dual stationary pyrolysis chamber 80 and two spiral conveyers 81, according to one exemplary embodiment.

As an option, the illustration of FIG. 5 may be viewed in the context of the previous Figures. Of course, however, the illustration of FIG. 5 may be viewed in the context of any desired environment. Further, the aforementioned definitions may equally apply to the description below.

It is understood that a pyrolysis chamber such as stationary pyrolysis chamber 70 may include any number of conveyers, or agitators, such as worm, or spiral, conveyer 81. FIG. 5 shows such dual pyrolysis chamber 80 with two spiral conveyers 81. Other than including two spiral conveyers 81, dual pyrolysis chamber 80 may have a structure similar to pyrolysis chamber 70. Other than the dual pyrolysis chamber 80, continuous pyrolysis system 79 may have structure and components similar to inductive continuous pyrolysis system 69.

Reference is now made to FIG. 6, which is a simplified illustration of cut through the latitude of an inductive continuous pyrolysis system 82 with a dual pyrolysis chamber 83 and two propeller conveyers 84, according to one exemplary embodiment.

As an option, the illustration of FIG. 6 may be viewed in the context of the previous Figures. Of course, however, the illustration of FIG. 6 may be viewed in the context of any desired environment. Further, the aforementioned definitions may equally apply to the description below.

As shown in FIG. 6, inductive continuous pyrolysis system 82 is similar to inductive continuous pyrolysis system 79 of FIG. 5, however including two propeller conveyers 84 instead of the spiral conveyers 81 of inductive continuous pyrolysis system 79. Each of propeller conveyers 84 may include a plurality of 'wings' 85 distributed along the axis 86 of each propeller conveyers 84 so that when being rotated the wings 85 of a first propeller conveyers 84 do not collide with wings 85 of a second propeller conveyers 84.

Figure 7:
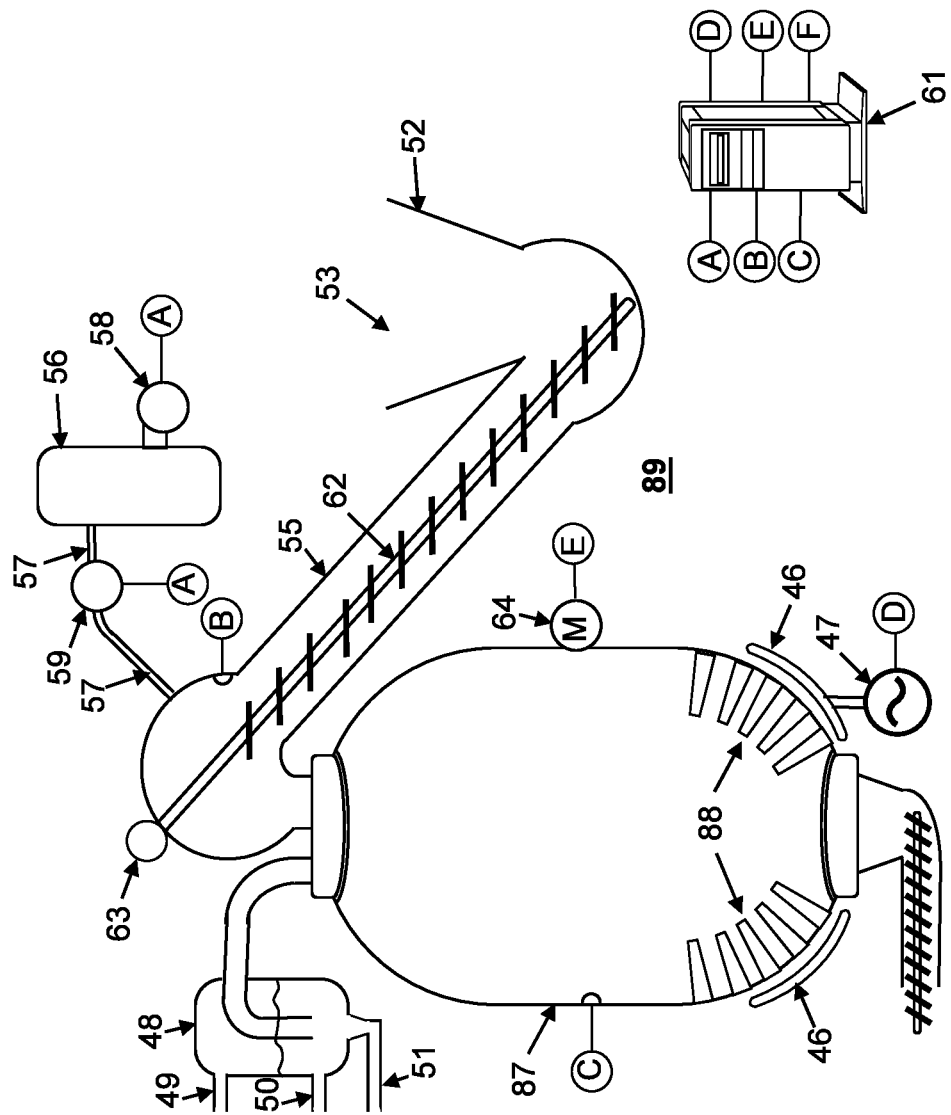
FIG. 7 is a simplified illustration of cut through a vertically rotating inductive continuous pyrolysis system with a fixed agitator.

Reference is now made to FIG. 7, which is a simplified illustration of cut through a vertically rotating pyrolysis chamber 87 with a fixed agitator 88, of an inductive continuous pyrolysis system 89, according to one exemplary embodiment.

As an option, the illustration of FIG. 7 may be viewed in the context of the previous Figures. Of course, however, the illustration of FIG. 7 may be viewed in the context of any desired environment. Further, the aforementioned definitions may equally apply to the description below.

As shown in FIG. 7, inductive continuous pyrolysis system 89 is similar to inductive continuous pyrolysis system 38 if FIG. 2A, however its pyrolysis chamber 87 is rotating about a vertical axis, and therefore the input and outputs of the pyrolysis chamber 87 is arranged accordingly.

It is appreciated that Nitrogen source 56 of inductive continuous pyrolysis system 89 (as shown in FIG. 7) may be replaced by heating chamber 65 of FIG. 3, or any other source of low-Oxygen air, or a similar gas material.

Figure 8:
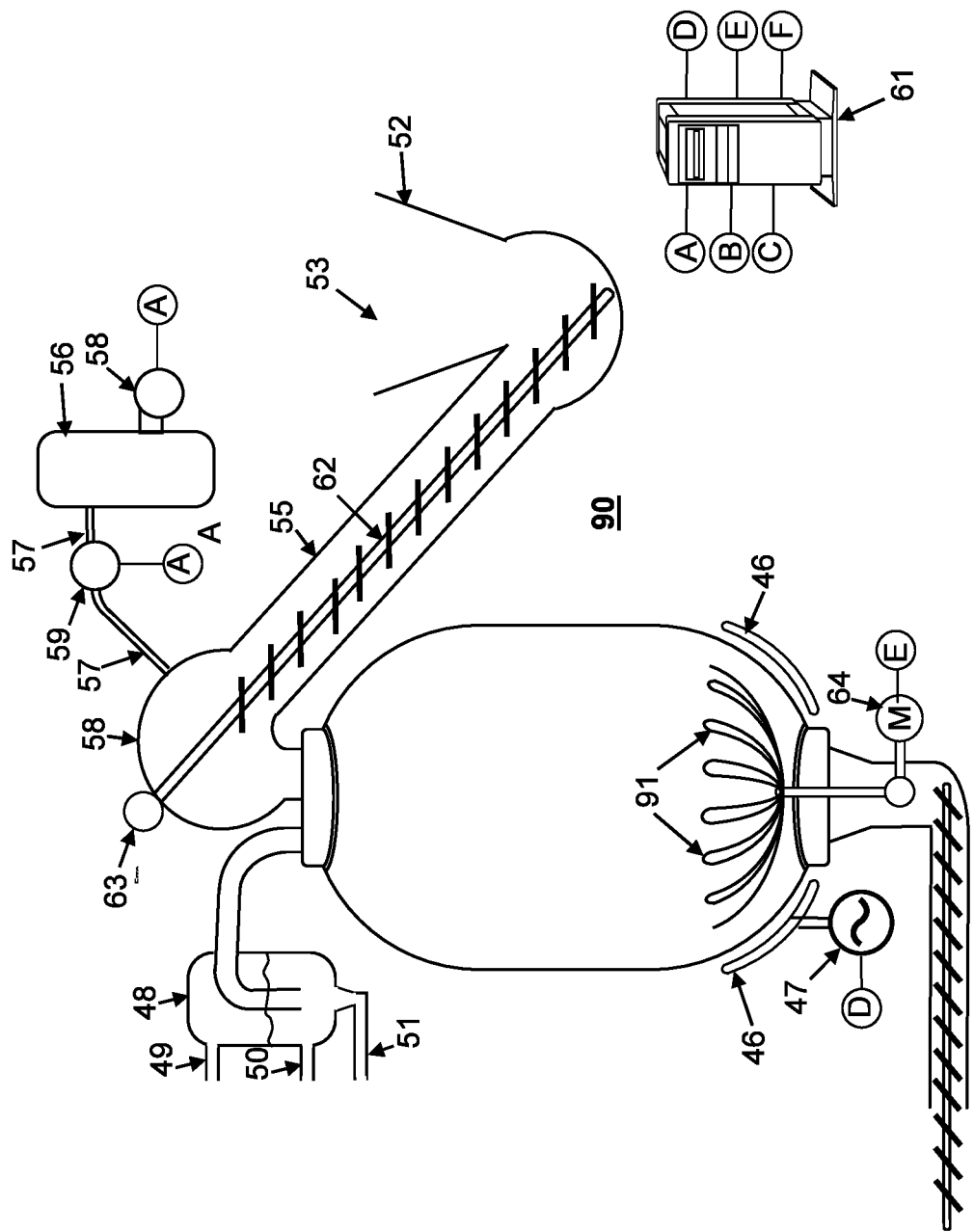
FIG. 8 is a simplified illustration of cut through a vertically stationary inductive continuous pyrolysis system with a vertically rotating agitator.

Reference is now made to FIG. 8, which is a simplified illustration of cut through a vertically stationary inductive continuous pyrolysis system 90 with a vertically rotating agitator 91, according to one exemplary embodiment.

As an option, the illustration of FIG. 8 may be viewed in the context of the previous Figures. Of course, however, the illustration of FIG. 8 may be viewed in the context of any desired environment. Further, the aforementioned definitions may equally apply to the description below.

As shown in FIG. 8, inductive continuous pyrolysis system 90 is similar to inductive continuous pyrolysis system 89 of FIG. 7, however having a vertically rotating agitator 91.

It is appreciated that Nitrogen source 56 of inductive continuous pyrolysis system 90 (as shown in FIG. 8) may be replaced by heating chamber 65 of FIG. 3, or any other source of low-Oxygen air, or a similar gas material.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable sub-combination.

Although descriptions have been provided above in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

What is claimed is:

1. A system for continuous pyrolysis comprising:
    a pyrolysis chamber comprising a first input opening, and a first output opening;
    a heating chamber comprising a second input opening, and a second output opening;
    a feeding chamber comprising:
        a third feeding opening, opened to ambient atmosphere and arranged to receive grinded material;
        a third pressure opening; and
        a third output opening coupled to the first input opening of the pyrolysis chamber;
    a flame injector device coupled to the second input opening of the heating chamber and injecting ambient air and combustible material into the heating chamber;
    a pumping device comprising:
        an input opening coupled to the second output opening of the heating chamber; and
        an output opening coupled to the third pressure opening of the feeding chamber;
    a measuring apparatus comprising at least one of:
        a $O_2$ sensor installed within the heating chamber; and
        a pressure transducer installed within the feeding chamber; and
    a controller electrically coupled to the measuring apparatus, to the flame injector and to the pumping device, and configured to maintain at least one of:
        control the flame injector device to inject at least one of said ambient air and said combustible material to maintain within the heating chamber $O_2$ concentration between 8% and 10%; and
        control the pumping device to maintain pressure in the feeding chamber above ambient pressure to prevent ambient air from entering the feeding chamber via the third feeding opening.

2. The continuous pyrolysis system according to claim 1, wherein the pyrolysis chamber is located within the heating chamber.

3. The continuous pyrolysis system according to claim 2, and additionally comprising:
    the heating chamber additionally comprises a rolling input opening and a rolling output opening;
    an input pipe installed within the rolling input opening and connecting between the third output opening of the feeding chamber and the first input opening of the pyrolysis chamber;
    an output pipe installed within the rolling output opening and coupled to the first output opening of the pyrolysis chamber;

wherein the pyrolysis chamber is arranged to rotate within the heating chamber; and
wherein the flame injector device is controlled by the controller to heat the pyrolysis chamber to a predefined temperature.

4. The continuous pyrolysis system according to claim 3, wherein the pyrolysis chamber has the shape of a cylinder and is at least partly made of thermally conductive material.

5. The continuous pyrolysis system according to claim 1, additionally comprising:
a unidirectional valve device coupled to the first output opening of the pyrolysis chamber to enable a continuous flow of gaseous material out of the pyrolysis chamber, and to prevent the flow of ambient air into the pyrolysis chamber through the first output opening.

6. The continuous pyrolysis system according to claim 1, additionally comprising:
a conveyer device arranged to propel the grinded material from the feeding chamber to the pyrolysis chamber.

7. The continuous pyrolysis system according to claim 1, additionally comprising:
a conveyer device arranged to propel the grinded material from the feeding chamber into the pyrolysis chamber; and
an inductive heating device for heating the grinded material inside the pyrolysis chamber.

8. The continuous pyrolysis system according to claim 1, wherein:
the pyrolysis chamber is made of a thermally insulating material; and
the pyrolysis chamber contains at least one of inductive element comprising at least one of ferromagnetic and ferrimagnetic material for being heated by the inductive heating device for heating the grinded material.

9. The continuous pyrolysis system according to claim 8, wherein the inductive element is at least one of:
affixed within the pyrolysis chamber; and
freely distributed within the pyrolysis chamber.

10. A method of continuous pyrolysis, the method comprising:
providing a pyrolysis system comprising:
a pyrolysis chamber comprising a first input opening, and a first output opening;
a heating chamber comprising a second input opening, and a second output opening;
a feeding chamber comprising:
a third feeding opening, opened to ambient atmosphere and arranged to receive grinded material;
a third pressure opening; and
a third output opening coupled to the first input opening of the pyrolysis chamber;
a flame injector device coupled to the second input opening of the heating chamber and injecting ambient air and combustible material into the heating chamber;
a pumping device comprising:
an input opening coupled to the second output opening of the heating chamber; and
an output opening coupled to the third pressure opening of the feeding chamber;
a measuring apparatus comprising at least one of:
a $O_2$ sensor installed within the heating chamber; and
a pressure transducer installed within the feeding chamber; and
a controller electrically coupled to the measuring apparatus, to the pressure transducer, to the flame injector and to the pumping device;

controlling, by said controller, the flame injector device, to inject at least one of said ambient air and said combustible material to maintain within the heating chamber $O_2$ concentration between 8% and 10%, to effect pyrolysis in the pyrolysis chamber; and
controlling, by said controller, the pumping device, to maintain pressure in the feeding chamber, above ambient pressure, to prevent ambient air from entering the feeding chamber via the third feeding opening.

11. The method according to claim 10, wherein the pyrolysis chamber is located within the heating chamber.

12. The method according to claim 11, and additionally comprising:
providing the heating chamber additionally comprising a rolling input opening and a rolling output opening;
providing an input pipe installed within the rolling input opening and connecting between the third output opening of the feeding chamber and the first input opening of the pyrolysis chamber;
providing an output pipe installed within the rolling output opening and coupled to the first output opening of the pyrolysis chamber;
rotating the pyrolysis chamber within the heating chamber; and
controlling, by the controller, the flame injector device, to heat the pyrolysis chamber to a predefined temperature.

13. The method according to claim 12, wherein the pyrolysis chamber has the shape of a cylinder and is at least partially made of thermally conductive material.

14. The method according to claim 10, additionally comprising:
outputting gaseous material out of the pyrolysis chamber through a unidirectional valve device coupled to the first output opening of the pyrolysis chamber, to enable a continuous flow of the gaseous material out of the pyrolysis chamber, and to prevent the flow of ambient air into the pyrolysis chamber through the first output opening.

15. The method according to claim 10, additionally comprising:
propelling the grinded material from the feeding chamber to the pyrolysis chamber using a conveyer device.

16. The method according to claim 10, additionally comprising:
providing an inductive heating device; and
providing a conveyer device between the feeding chamber and the pyrolysis chamber;
propelling the grinded material from the feeding chamber into the pyrolysis chamber using the conveyer device; and
heating the grinded material inside the pyrolysis chamber using the inductive heating device.

17. The method according to claim 10, wherein:
the pyrolysis chamber is made of a thermally insulating material; and
distributing within the pyrolysis chamber at least one of inductive element comprising at least one of ferromagnetic and ferrimagnetic material for being heated by the inductive heating device for heating the grinded material.

18. The method according to claim 17, wherein the inductive element is at least one of:
affixed within the pyrolysis chamber; and
freely distributed within the pyrolysis chamber.

* * * * *